United States Patent [19]

Lee

[11] Patent Number: 5,607,611
[45] Date of Patent: Mar. 4, 1997

[54] OPERATING SWITCH OF MICROWAVE OVEN AND CONTROL CIRCUIT THEREOF

[75] Inventor: Sung-Ho Lee, Suwon, Rep. of Korea

[73] Assignee: Samsung Electronics Co., Ltd., Suwon, Rep. of Korea

[21] Appl. No.: 366,467

[22] Filed: Dec. 30, 1994

[30] Foreign Application Priority Data

Dec. 31, 1993 [KR] Rep. of Korea ............ U.M. 93-31719
Dec. 6, 1994 [KR] Rep. of Korea ............ 94-32956

[51] Int. Cl.⁶ .................................................. H05B 6/64
[52] U.S. Cl. .................... 219/702; 219/719; 219/720; 200/13; 200/5 B
[58] Field of Search .................... 219/719, 720, 219/715, 702, 506; 200/13, 14, 5 R, 5 A, 5 B

[56] References Cited

U.S. PATENT DOCUMENTS

| | | | |
|---|---|---|---|
| 3,207,861 | 9/1965 | White | 200/14 |
| 3,621,158 | 11/1971 | Swinstead | 200/14 |
| 4,028,517 | 6/1977 | Tanaka et al. | 219/719 |
| 4,309,584 | 1/1982 | Terakami | 219/720 |
| 4,430,540 | 2/1984 | Scalf | 219/719 |
| 4,568,810 | 2/1986 | Carmean | 219/720 |
| 4,697,057 | 9/1987 | Fowler | 219/719 |
| 5,134,262 | 7/1992 | Lee | 219/719 |
| 5,349,164 | 9/1994 | Ohta | 219/720 |
| 5,363,481 | 11/1994 | Tilt | 395/156 |

*Primary Examiner*—Philip H. Leung
*Attorney, Agent, or Firm*—Burns, Doane, Swecker & Mathis, L.L.P.

[57] ABSTRACT

A microwave oven has a switch mechanism for selecting first and second cooking functions and activating/deactivating a magnetron of the microwave oven. The switch mechanism comprises first and second rotary switches actuable by respective coaxial knobs for generating encoded signals to establish the first and second cooking functions, respectively. One of the knobs can be pushed axially to activate/deactivate the magnetron.

4 Claims, 4 Drawing Sheets

OPERATING SWITCH OF MICROWAVE OVEN AND CONTROL CIRCUIT THEREOF

BACKGROUND OF THE INVENTION

1. Field of the Invention

The present invention relates to a microwave oven, and more particularly to an operating switch of microwave oven and a control circuit for controlling operating functions such as cooking menu selection, timer setting and cooking start/stop functions.

2. Description of the Prior Art

Generally, a conventional microwave oven comprises a menu selection means, timer setting means, and cooking start and stop means disposed separately on a control panel.

In the U.S. Pat. No. 5,134,262 (Lee), hereinafter referred to as the "Lee" patent, a single rotary knob has a dual function of setting a cooking timer value and a defrost timer value. However, means for making a selection from a cooking menu is not disclosed and accordingly, a separate means for making such a selection is needed. Furthermore, a switch for starting and stopping the cooking process is separately disposed such that the user is inconvenienced by having to search for the start/stop switch.

SUMMARY OF THE INVENTION

Accordingly, the present invention has been presented to solve the aforementioned drawbacks, and it is an object of the present invention to provide an operating switch and a control circuit of a microwave oven in which the aforementioned functions of cooking menu selection, timer setting and cooking start/stop are accomplished in a simpler yet speedier and more efficient manner.

In accordance with one aspect of the present invention, there is provided an operational switch of a microwave oven, the operational switch comprising: a first rotatable switching means and a second rotatable switching means supported on a common axis in which the first rotating switching means is movable in the direction parallel to the common axis to activate cooking process.

In accordance with another aspect of the present invention, there is provided a control circuit of a microwave oven, the control circuit comprising: a cooking input means for inputting a cooking time and a cooking menu; a control means for controlling an overall cooking operation according to the cooking time and cooking menu input by the cooking input means; a driving means for driving a magnetron in order to perform a cooking operation according to the control of the control means; and a display means for displaying the cooking time and cooking menu input by the cooking input means.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

The preferred embodiment of the present invention will now be described in detail with reference to the accompanying drawings.

Figure 1:
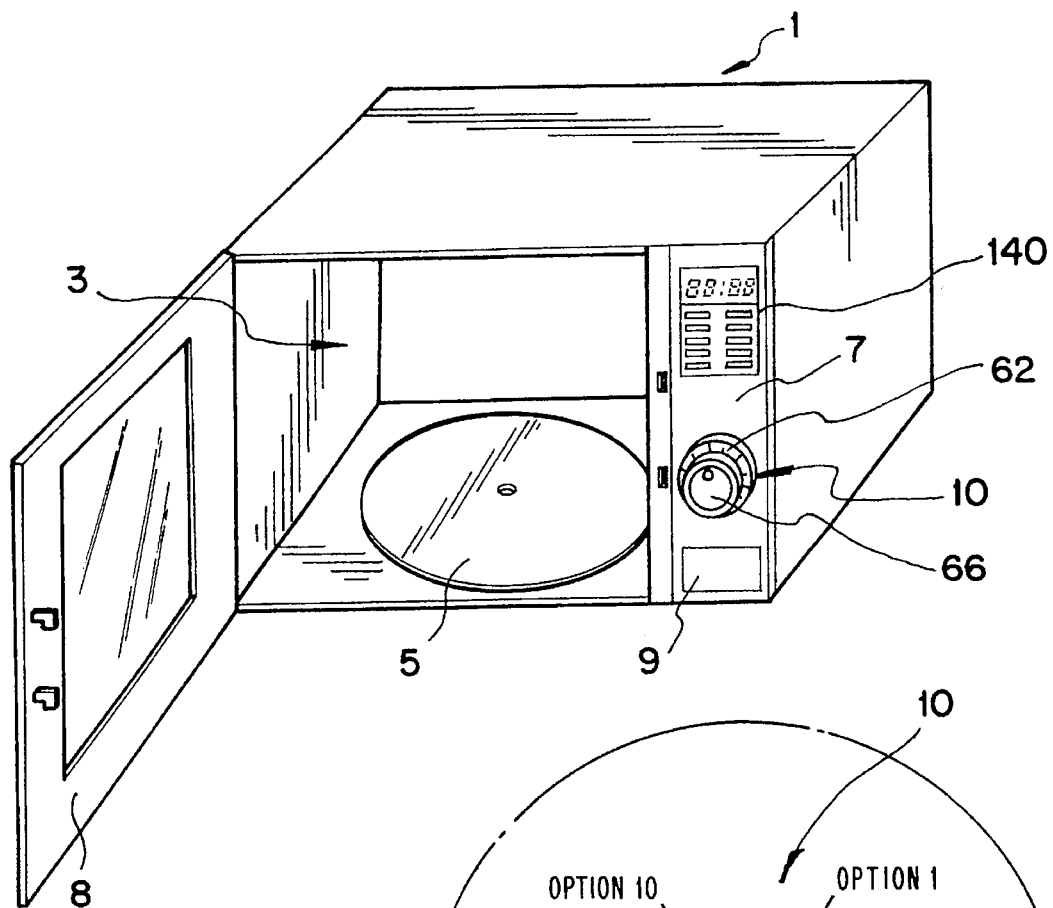
FIG. 1 is a schematic perspective view of a microwave oven according to one embodiment of the present invention.
Figure 1A:
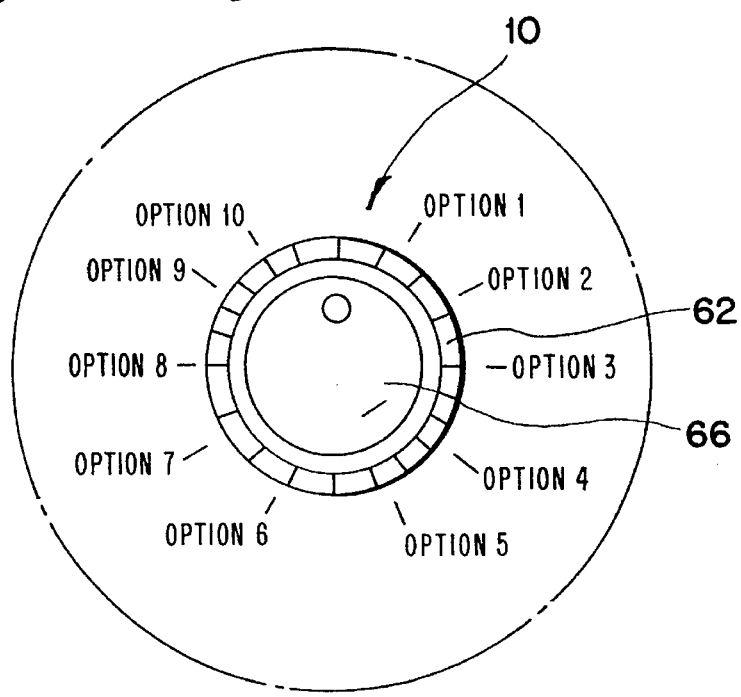
FIG. 1A is an enlarged view of a switch member according to one embodiment of the invention.

As illustrated in FIG. 1, reference numeral 1 denotes a body of a microwave oven, in which there is formed a cooking chamber 3 for cooking the food. The cooking chamber is closed by a door 8 which can be unlocked by a push button 9.

The cooking chamber 3 is provided at a lower end thereof with a rotating dish 5 for rotating the food therein to thereby cook the food evenly. A control panel 7 which is mounted on the right front surface of the body 1 is provided with an operational switch member 10 for selectively controlling two cooking functions such as, for example, the cooking time and cooking menu, and for also starting or stopping a cooking operation.

The operation switch member 10 is provided with a first switching means 66 rotatively mounted to set the cooking time, and the first switching means 66 is encircled by a second switching means 62 which is rotatively mounted to select the cooking menu.

Furthermore, an operation start means 14 is also provided for starting the cooking operation according to a push operation of the first switching means 66.

Figure 2:
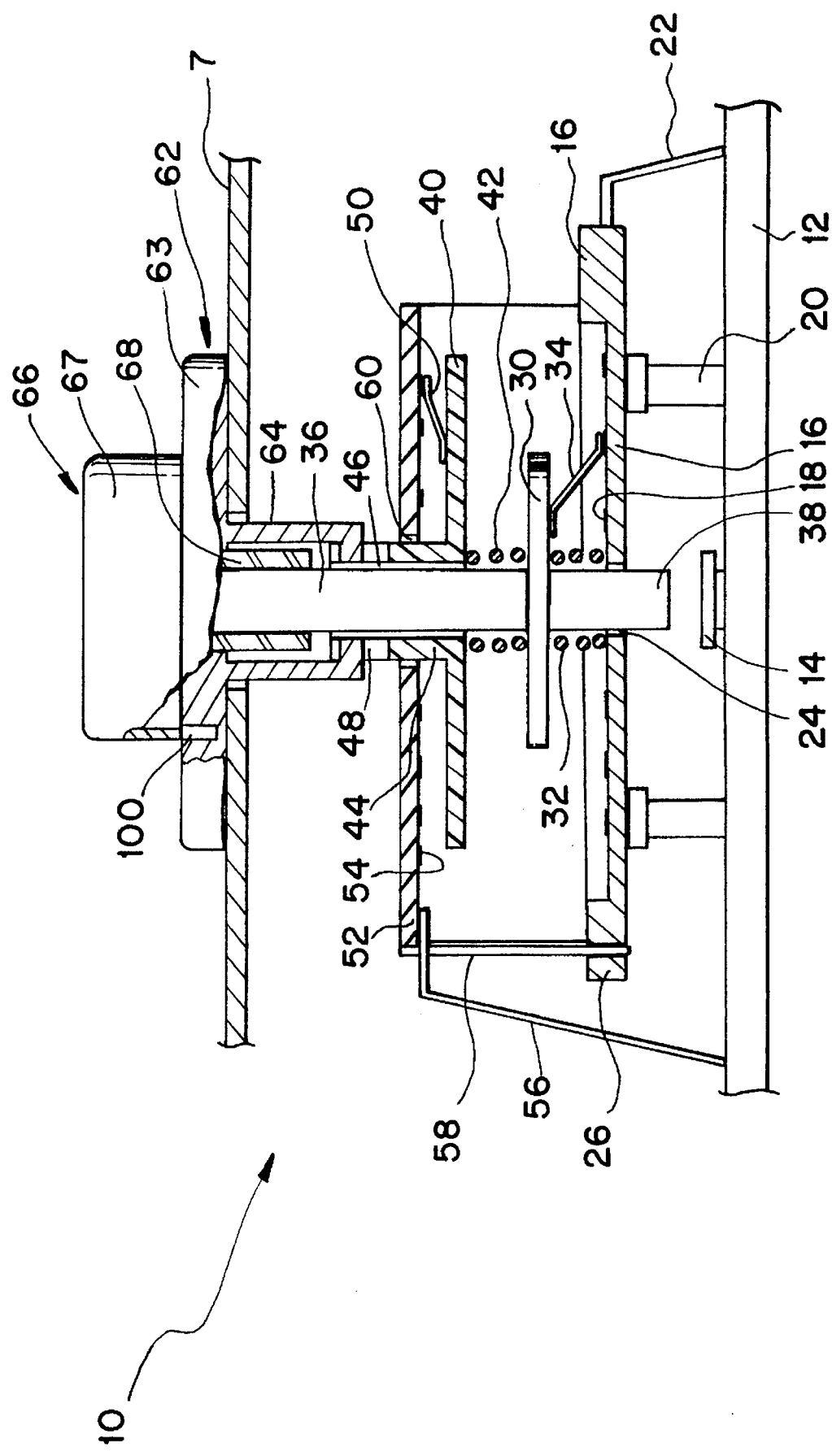
FIG. 2 is a sectional view of principal parts according to the present invention.

The operation start means 14 of the operation switch member 10 which, as illustrated in FIG. 2, is disposed within a predetermined position of the control panel 7. It may take the form of a tactile or touch switch mounted on a front center area of a printed circuit board (12, PCB) containing built-in circuit parts (not shown).

Figure 3:
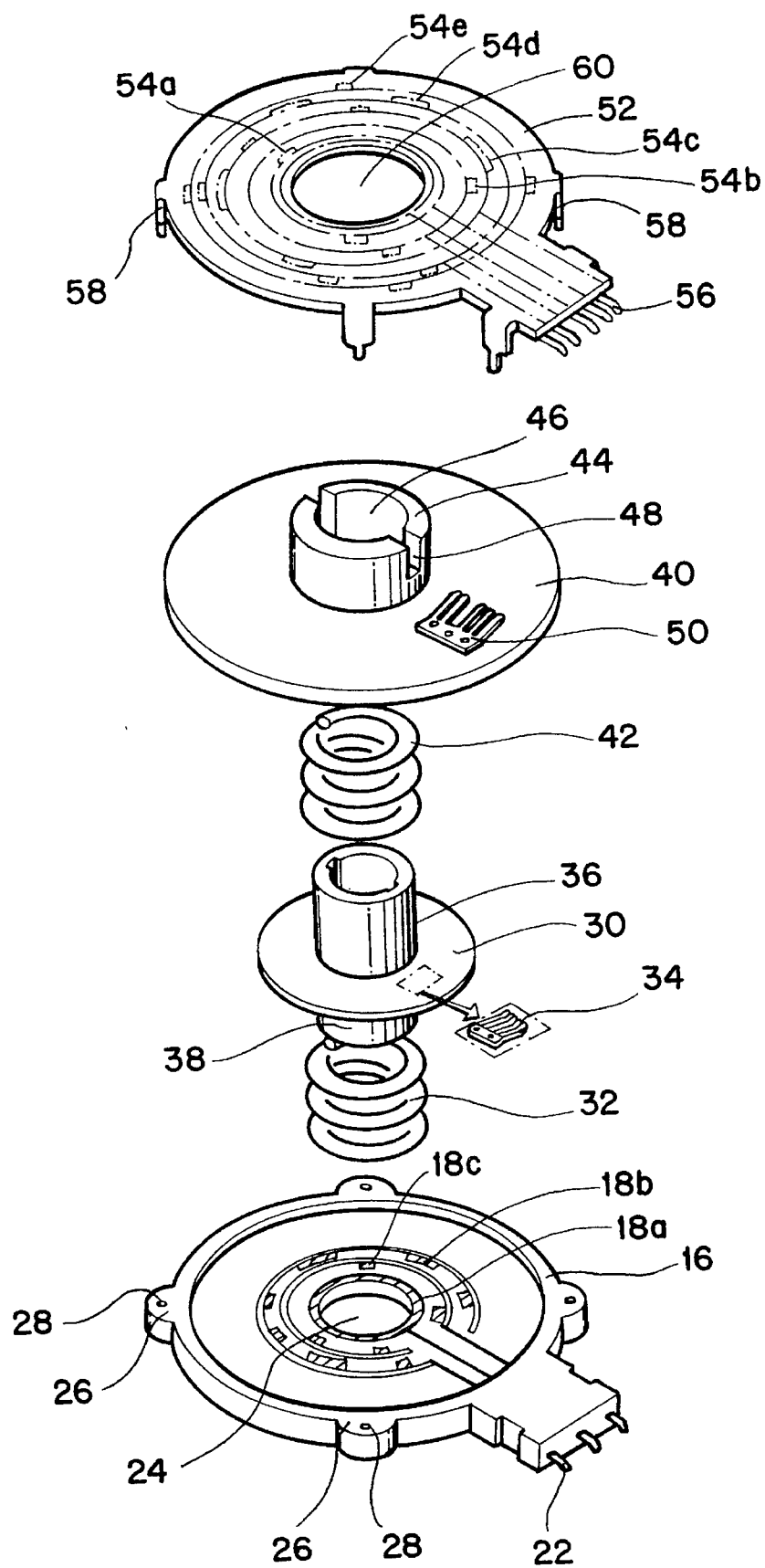
FIG. 3 is an exploded perspective view of principal parts according to the present invention.

As illustrated in FIGS. 2 and 3, a support member 16 of a disc shape provided with a copper-clad, thin rotary contact unit 18a, 18b, 18c thereon is fixed by a fixing member 20 to a front side of the PCB 12. On one side of the support member 16, there is attached a terminal 22 to connect the control circuit mounted on the PCB 12 whether or not the copper-clad thin unit 18 is electrically connected to an individual contact point (to be described hereinafter).

The support member 16 is provided on an inner periphery thereof with a through hole 24, and the support member 16 is provided on a periphery thereof with a plurality of protrusions 26, in which holes 28 are formed.

Situated at a predetermined distance from the support member 16 is a disc-shaped rotatable first switching disc 30 in order to output an established cooking time in the form of an encoded signal. The disc 30 is biased away from the support member 16 by a coil compression spring 32.

Attached to the first switching disc 30 on a rear surface thereof is a contact click or rotatable contact 34 resiliently engageable with the copper-clad thin unit 18 mounted on a front surface of the support member 16.

The first switching disc 30 has a cylindrical shape and is integrally linked to rotatable first shafts 36 and 38, and the shaft 36 extends forwardly past a front surface of the control panel 7 to thereby be equipped with a first switching knob 67 for establishing a user-desired cooking time and at the same time, for starting the cooking operation.

The first switching knob 67 and the first switching disc 30 are coupled together via the first shaft 36.

The first switching knob 67 can be moved axially in order to turn on or turn off the operation start means 14 mounted on the PCB 12.

The presently disclosed embodiment is constructed to perform the turn-on or turn-off operation by way of the operation start means 14 mounted behind the shaft 36. However, it should be apparent that the operation start means 14 could be turned on or turned off by a switch arranged anywhere so as to be actuable in response to a pressing of the knob 67, or even by a pressing of the knob 63 (if knob 63 were made capable of being depressed).

The resilient spring member 32 surrounds the first shaft 38 and 36 is located behind the first switching disc 30 for pushing the shaft 38 away from the operation start means 14.

Furthermore, in the drawings, the second switching means 62 of the operation switch member 10 includes a disc-shaped rotatable second switching disc 40 in order to generate the user-selected cooking menu as encoded signals. The second switching disc 40 is spaced in front of the first switching disc 30 by a resilient member in the form of a coil compression spring 42 and has at a front side thereof a cylinder-shaped rotatable second shaft 44 integrally formed with the second switching disc 40.

The second shaft 44 has a central through hole 46 so that the first shaft 36 can be inserted therethrough, and the front end of the second shaft 44 is provided with diametrically opposed slits 48.

The second switching disc 40 includes a front surface which carries a resilient contact click 50. Disposed in front of the disc 40 is a disc-shaped cover member 52 having a copper-clad thin rotary contact unit 54a–e on a rear surface thereof. The unit 54 is engaged by the contact click 50 so that the cooking menu selected by the user can be output to a control circuit of the PCB 12.

The cover member 52 is provided at one side thereof with a terminal 56 in order to connect the control circuit of the cover member 52 with the PCB 12 whether or not the copper-clad thin unit 54 is electrically connected to an individual contact point.

The cover member 52 is formed at a periphery thereof with a plurality of protrusions 58 which can be inserted into the holes 28 formed in the support member 16.

Furthermore, the cover member 52 is formed at an inner periphery thereof with a through hole 60 through which the second shaft 44 can be inserted.

A ring-shaped rotatable second switch knob 63 is situated in front of the control panel 7 and carries rearwardly extending projections 64 that are received in the slits 48 formed in the second shaft 44. By rotating the knob 63, the disk 40 is rotated so that the cooking menu the user wants can be selected.

The second switching knob 63 has a groove 100 formed in an upper surface thereof so that the first knob 67 can move axially rearwardly relative thereto sufficiently to enable the shaft 38 to contact the switch 14.

Meanwhile, the resilient member 42 surrounding the first shaft 36 is a spring for biasing the disc 40 forwardly so that the contact click 50 can engage the electrical pads 54.

Figure 4:
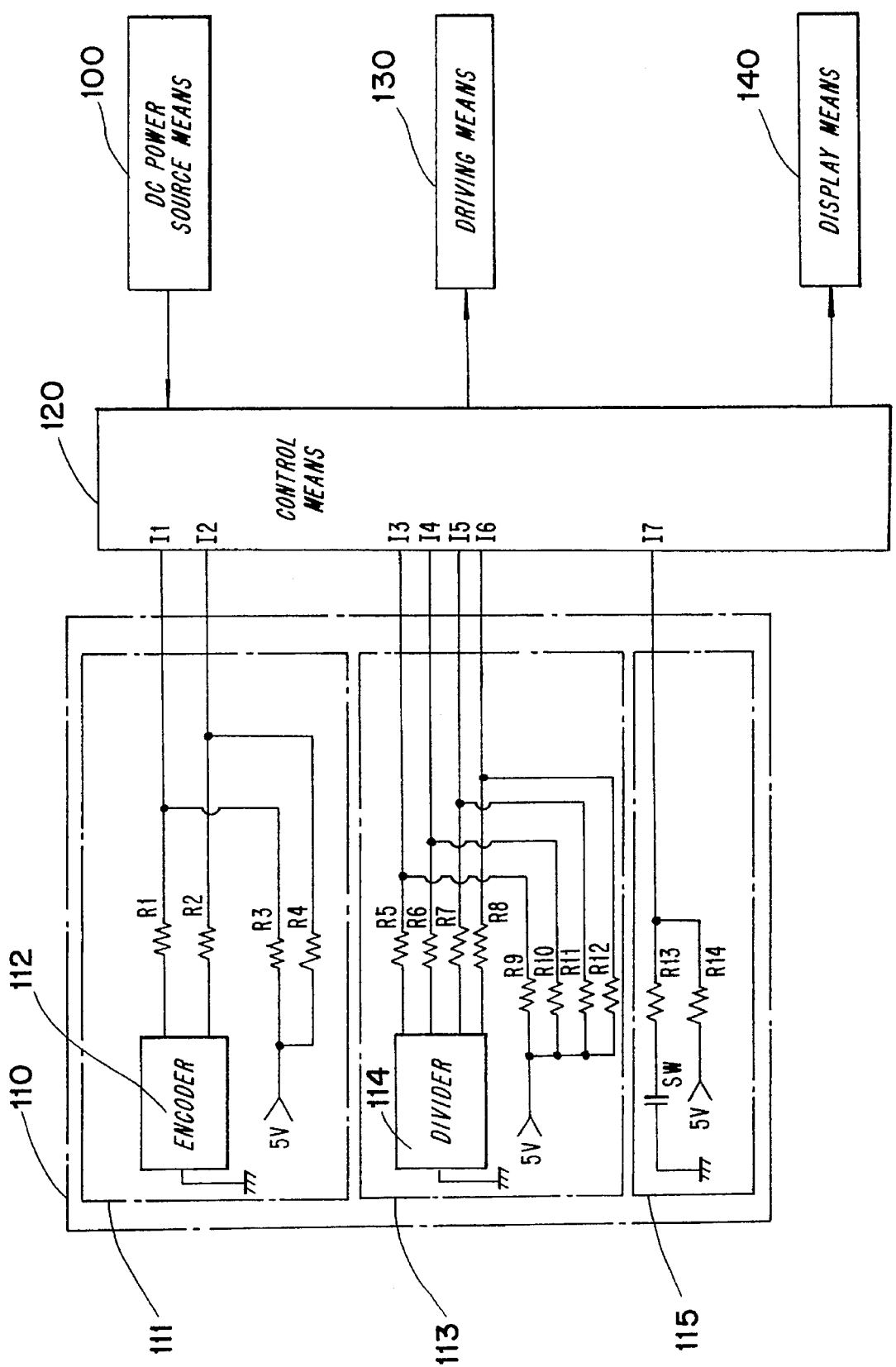
FIG. 4 is a block diagram of a control circuit for the microwave oven according to one embodiment of the present invention.

FIG. 4 is a schematic diagram illustrating a circuit construction for controlling the cooking operation of the microwave oven during the cooking time or cooking menu selection by way of the above-described operation switch member 10.

As illustrated in FIG. 4, a DC power source means 100 receives a normal AC power supplied from an AC power source input terminal (not shown) and thereafter converts the same to a predetermined DC voltage necessary for driving the microwave oven.

Furthermore, a cooking input means 110 includes the integrally-assembled rotatable rotary switch 10 for inputting the user-wanted cooking functions (cooking time, cooking menu, output of the microwave oven and start/stop of the cooking operation). The means 110 comprises: a time setting unit 111 (including the knob 67, disc 30, support member 16, and contact click 34) for setting a cooking time; a menu selecting unit 113 (including the knob 63, disc 40, cover member 52, and contact click 50) for selecting a variety of cooking menus (by way of example, defrosting, rice cooking, steamed dish, stew, parboil and the like) during a cooking time input according to the time setting unit 111; and an operation start unit 115 (including knob 67, shaft 38, and operation start means 14) for selecting an operation start or operation stop in order to perform the cooking operation according to the cooking menus selected by the menu selecting unit 113 and the cooking time set by the time setting unit 111.

The control means 120 (including the circuit board 12) is a microcomputer for receiving a DC current voltage output from the DC power source means 100 to thereby initiate operation of the microwave oven and, at the same time, control the overall operation of the microwave oven according to the cooking time, cooking menu and starting and/or stopping of the cooking operation input to the cooking input means 110.

The microcomputer is provided with memory such as ROM and the like so that a program corresponding to the selected cooking menu is stored in an address of a memory corresponding to a value represented in a pulse signal.

The driving means 130 comprises a relay and the like for supplying or interdicting a driving power source of a magnetron which oscillates a high frequency in order to perform the cooking operation upon receiving a control signal generated from the control means 120. A display means 140 displays the cooking time, cooking menu or the like which has been input by the user utilizing the cooking input means 110.

In the drawing, the time setting unit 111 of the cooking input means 110 comprises: an encoder 112 (comprising first switching disc 30, shaft 36 and first switching knob 67) for outputting an established cooking time in the form of an encoded signal, and resistors R1, R2, R3 and R4 connected to an output terminal of the encoder 112 so that a power source voltage (VCC; 5 V) applied from the outside (e.g., from DC power source means 100) according to the pulse signal encoded by the encoder 112 can be output to the control means 120.

The menu selecting unit 113 of the cooking input means 110 comprises: a second encoder 114 for outputting the selected cooking menu in the form of a coded pulse signal, and resistor R5 to R12 connected to an output terminal of the divider 114 so that the power source voltage (5 V) applied from the outside according to the pulse signal encoded by the second encoder 114 can be output to the control means 120. The second encoder 114 comprises the second switching means 62, second switching disc 40, and second shaft 44.

Furthermore, the operation start unit 115 of the cooking input means 110 comprises: the tactile or touch switch 14 for activating or deactivating the selected cooking operation, and resistors R13 and R14 for being connected to one side of the switch 14 so that the power source voltage (5 V) supplied from the outside (e.g., DC power source means 100) can be output to the control means 120 during the turning-on or turning-off of the tactile switch 14.

The operation of the operation switch 10 of the microwave oven and control switch 14 thereof thus constructed will now be described.

First of all, when the power is supplied to the microwave oven, the DC power source means 100 receives the normal AC power source supplied from an AC power source input terminal (not shown) to thereby change the same into a predetermined DC voltage necessary for operating the microwave oven, and to output the same to the control means 120 and respective driving circuits.

Accordingly, the control means 120 is initialized when it receives the DC voltage output from the DC power source means 100 according to the cooking operation of the microwave oven.

At this time, the user places the desired food on the rotating dish 5, and inputs the desired cooking time and cooking menu selection by rotating the operation switch member 10. A method for inputting the cooking time and cooking menu according to a rotational operation of the operation switching member 10 will now be described in detail.

It will be appreciated that since the knob 67 controls the selection of the cooking time, and the knob 63 controls the selection of the cooking menu, the mechanism could be constructed for a reverse operation, i.e., knob 67 controlling cooking menu selection, and knob 63 controlling cooking time selection.

First of all, when the first switching knob 67 of the operating switch member 10 is pressed by the user, the first shaft 36 connected to the first switching knob 67 travels rearwardly, so that the first shaft 38 can be connected to the tactile switch 14 to thereby turn on the tactile switch 14.

Upon release of the knob 67, the first shaft 36 is pushed forwardly from the tactile switch 14 by the elastic force of the resilient member (i.e., coil spring) 32 to thereafter return to an original position.

It is apparent from the foregoing, that when the first shaft 36 is moved rearwardly, thereby turning on the tactile switch 14, the power source voltage (5 V) supplied from the outside is grounded to earth via the resistors R14 and R13 and the tactile switch 14, so that a signal of a low level is input to an input terminal 17 of the control means 120.

Accordingly, the control means 120 receives the signal of a low level via the input terminal I7, and discriminates that the tactile switch 14 is activated. The control means 120 now displays via the display means 140 that the cooking time is, e.g., "one minute" and outputs to the driving means 130 the control signal for controlling the drive of the magnetron.

At this time, the control means 120 starts counting the driving time of the magnetron by way of a timer therewithin.

Hence, the driving means 130 drives the magnetron for one minute counted by the timer and performs the cooking operation.

Next, when the cooking time is set by the user by way of rotational operation of the first switching knob 67 on the operating switch member 10, the first switching disc 30 integrally formed with the first shaft 36 is rotated by the rotational of first switching knob 67.

The contact click 34 mounted on a bottom surface of the first switching disc 30 is rotated above the upper surface of the support member 16 according to rotation of the first switching disc 30, and makes contact or non-contact with the copper-clad thin rotary contact unit 18 attached to the upper surface of the support member 16.

When the contact click 34 makes contact with the copper-clad thin unit 18, the encoder 112 outputs a pulse of a high level to the control means 120 with the PCB 12 via a terminal 22 mounted to one side of the support means, and when the contact click 34 does not make contact with the copper-clad unit 18, the encoder 112 outputs a signal of a low level to the control means via the terminal 22.

It should be apparent that the effect will be the same if the encoder 112 is constructed in such way as to output a pulse signal of a low level when the contact click 34 makes contact with the copper-clad thin unit 18, and to output a pulse signal of a high level when the contact click 34 does not make contact with the copper-clad thin unit 18.

The pulse signal output from the encoder 112 according to rotational operation of the first switching knob thus described, in case of a 2-bit signal, is an output of a binary code of 00, 01, 10, 11.

If the pulse signal output from the encoder 112 is "00", the power source voltage (5 V) applied from the outside is grounded to earth via resistors (R3, R1) (R4, R2), so that input terminals 11 and 12 of the control means 120 are received of a signal of a low level.

Accordingly, the control means 120 receives a signal of a low level via the input terminals I1 and I2 and seeks an address corresponding to the pulse signal output from the encoder 112 to thereafter perform a built-in program and to discriminate how many minutes are involved for the cooking time established at the first switching knob 67 to thereafter display the cooking time with the help of the display means 140.

As described above, when the first switching knob 67 is pressed after the desired cooking time is set by way of rotational operation of the first switching knob 67, the first shaft 36 is moved downwards to thereafter make contact with the tactile switch 14 and to turn on the tactile switch 14.

When the tactile switch 14 is rendered active, the power source voltage (5 V) supplied from the outside is grounded to earth via the resistors R14 and R13 and the tactile switch 14, thereby causing an input terminal I7 of the control means 120 to receive a signal of a low level.

Accordingly, the control means 120 now discriminates that the tactile switch 14 is turned on, thereby causing the control signal for performing the cooking operation to be output to the driving means 130, and starts counting the driving time of the magnetron.

Consequently, the driving means 130 drives the magnetron during the cooking time set by the first switching knob 67 according to the control of the control means 120 to thereby execute the desired cooking operation.

Furthermore, when the desired cooking menu (one out of Option 1 through Option 10) is selected by the user according to the rotational operation of the second switch knob 63 on the operation switch member 10, the second shaft 44 connected to the second switch knob 63 is rotated.

When the second shaft 44 is rotated, the second switching disc 40 integrally formed with the second shaft 44 is rotated by the rotational operation of the second switch knob 63, and according to the rotation of the second switching disc 40, the contact click 50 attached to the upper surface of the second switching disc 40 rotates a bottom surface of the cover member 52 to thereby make contact or not make contact with the copper-clad thin unit 54 mounted at a bottom surface of the cover member 52.

When the contact click 50 makes contact or does not make contact with the copper-clad thin unit 54, the second encoder 114 discriminates whether or not the contact click 50 is electrically connected to the copper-clad thin unit 54 and outputs the same as a coded pulse signal.

In other words, when the contact click 50 makes contact with the copper-clad thin unit 54, the second encoder 114 outputs a pulse signal of a high level to the control means 120 through a terminal 56 mounted on one side of the cover member 52, and when the contact click 50 is not connected to the copper-clad thin unit 54, the second encoder 114 outputs a pulse signal of a low level to the control means 120 through the terminal 56.

Meanwhile, it should be apparent that the effect will be the same if the second encoder 114 is so made as to output an encoded signal of a low level when the contact click 50 is connected to the copper-clad thin unit 54, and as to output an encoded signal of a high level when the contact click is not connected to the copper-clad thin unit 54.

If the pulse signal output from the second encoder 114 according to the rotational operation of the second switch knob 63 is a 4-bit binary code of 0000, 0001, 0010, 0011 . . . and 1111 is output.

If the pulse signal output from the second encoder 114 is "0000", the power source voltage (5 V) applied from the outside is grounded to earth via resistors (R9, R5), (R10, R6), (R11, R7) and (R12, R8), so that a signal of a low level is input to input terminals I3, I4, I5 and I6 of the control means 120.

Accordingly, the control means 120 receives a signal of low level input through the input terminals I3, I4, I5 and I6 and seeks an address corresponding to the pulse signal output from the second encoder 114 to thereby perform the built-in program. The control means 120 then discriminates which cooking menu has been selected by the second switch knob 63 and displays the selected cooking menu through the display means 140.

When the first switching knob 67 is pressed after the desired cooking menu is selected by way of rotational operation of the second switch knob 63, the first shaft 36 is moved rearwards, so that the first shaft 36 can make contact with the tactile switch 14 to thereby turn on the tactile switch 14.

When the tactile switch 14 is activated, the power source voltage (5 V) supplied from the outside is grounded to earth through the resistors R13, R14 and the tactile switch 14, thereby causing the input terminal I7 of the control means 120 to receive a signal of low level.

Accordingly, the control means 120 now discriminates that the tactile switch 14 is turned on to thereby cause the control signal for performing the cooking operation to be output to the driving means 130 and starts counting the driving time of the magnetron.

Consequently, the driving means 130 drives the magnetron according to the control of the control means 120 during an established time corresponding to the cooking menu selected by the second switch knob 62, thereby performing the cooking operation.

As seen from the foregoing, due to the configuration and functioning of the operating switch of the microwave oven and control circuit described above, there is an advantage in that it is very comfortable to use the microwave oven because the cooking time, cooking menu, and the cooking driving start can be simply and selectively operated by way of an operating switch integrally formed on the same axial line on the control panel.

According to the present invention, there is another advantage in that assembling of the control panel of the microwave oven is easy and the external appearance of the control panel on the microwave oven is pleasing because respective switches for the cooking time, cooking menu and cooking driving start can be integrally formed on the control panel.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A microwave oven, comprising:

a housing forming a cooking chamber;

a magnetron for generating cooking pulses for cooking food in said cooking chamber; and a control mechanism connected to said magnetron for operating said magnetron, comprising:

a first switch mounted on said housing for setting a first cooking function, said first switch including: a first shaft rotatable about an axis and axially movable inwardly along said axis against a spring bias, a manually rotatable first knob affixed to an outer end of said first shaft and exposed on an outer surface of said housing, a rotatable electrical contact structure rotatable with said first shaft, and a stationary electrical contact structure affixed to said housing and engageable with said rotatable contact structure, one of said rotatable and stationary contact structures being flexible to permit electric contact to be maintained while said shaft is being inwardly moved along said axis;

a second switch mounted on said housing for setting a second cooking function; said switch including a second shaft rotatable about said axis and telescopingly arranged around said first shaft to permit said first shaft to be moved axially relative thereto, and a manually rotatable second knob affixed to said second shaft and exposed on an outer surface of said housing; and a third switch mounted inside of said housing and including an element arranged to be depressed along said axis by said first shaft when said first shaft is inwardly moved along said axis;

said first knob being of smaller cross section than said second knob and normally extending outwardly past said second knob along said axis, said first knob being depressible inwardly along said axis to move said first shaft axially inwardly, said first knob being telescopingly insertable into said second knob when inwardly depressed.

2. The oven according to claim 1, wherein said second switch further includes an additional rotatable electric contact structure rotatable with said second shaft, and an additional stationary electrical contact structure affixed to said housing and engageable with said additional rotatable contact structure; said additional rotatable electric contact structure being axially movable with respect to both said second shaft and said additional stationary electrical contact structure; and a spring arranged to bias said additional rotatable contact structure axially against said additional stationary electrical contact structure.

3. The oven according to claim 2, wherein said spring bias opposing axially inward movement of said first shaft is imposed by a spring which is separate from said spring which biases said additional rotatable contact structure against said additional stationary electrical contact structure.

4. The oven according to claim 3, wherein each of said two springs comprises a coil compression spring disposed coaxially around said first shaft.

* * * * *